United States Patent
Lee

(10) Patent No.: US 9,774,566 B2
(45) Date of Patent: Sep. 26, 2017

(54) COMMUNICATION METHOD AND MOBILE ELECTRONIC DEVICE USING THE SAME

(71) Applicant: Acer Incorporated, New Taipei (TW)

(72) Inventor: Jia-Hau Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 255 days.

(21) Appl. No.: 14/251,647

(22) Filed: Apr. 14, 2014

(65) Prior Publication Data

US 2015/0156166 A1    Jun. 4, 2015

(30) Foreign Application Priority Data

Nov. 29, 2013   (TW) ............................... 10214813 A

(51) Int. Cl.
| | | |
|---|---|---|
| H04W 52/02 | (2009.01) | |
| H04L 29/12 | (2006.01) | |
| H04L 29/14 | (2006.01) | |
| H04L 29/06 | (2006.01) | |

(52) U.S. Cl.
CPC ..... *H04L 61/2053* (2013.01); *H04W 52/0238* (2013.01); *H04L 61/2015* (2013.01); *H04L 69/16* (2013.01); *H04L 69/40* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2005/0005169 A1* | 1/2005 | Kelekar | ............... | H04L 63/1408 726/4 |
| 2008/0151773 A1* | 6/2008 | Kawaba | ............... | G06F 11/0748 370/252 |
| 2008/0298263 A1* | 12/2008 | Yamada | ............... | H04L 12/1877 370/252 |
| 2010/0220619 A1* | 9/2010 | Chikira | ............... | H04L 12/2602 370/252 |
| 2010/0251375 A1* | 9/2010 | Green | ................... | G06F 21/577 726/25 |

(Continued)

FOREIGN PATENT DOCUMENTS

| | | |
|---|---|---|
| TW | 201223214 | 6/2012 |
| TW | 201228363 | 7/2012 |

OTHER PUBLICATIONS

Bo-Hsun Huang, "A Distributed Network Change Detection System with OpenFlow on NetFPGA," Master Thesis of Master Program in Communication Engineering, Chung Yuan Christian University, 2013.

(Continued)

*Primary Examiner* — Brandon Renner
(74) *Attorney, Agent, or Firm* — Jianq Chyun IP Office

(57) ABSTRACT

A communication method and a mobile electronic device are provided. The communication method includes: receiving a message packet; determining whether or not the received message packet is an abnormal packet; and when the received message packet is determined out as the abnormal packet, increasing a count value; keeping to receive the message packets and determine whether or not the received message packet is an abnormal packet; and when the count value is greater than an upper-limit value, re-deriving an IP address.

4 Claims, 2 Drawing Sheets

(56) References Cited

U.S. PATENT DOCUMENTS

| | | | | |
|---|---|---|---|---|
| 2011/0002261 A1* | 1/2011 | Mocanu | ............... | H04W 8/26 |
| | | | | 370/328 |
| 2011/0078326 A1* | 3/2011 | Horibuchi | ......... | H04L 29/12367 |
| | | | | 709/232 |
| 2011/0199911 A1* | 8/2011 | Ikada | ............... | H04L 41/0681 |
| | | | | 370/242 |
| 2011/0238855 A1 | 9/2011 | Korsunsky et al. | | |
| 2014/0325648 A1* | 10/2014 | Liu | ............... | H04L 63/1458 |
| | | | | 726/22 |
| 2015/0042792 A1* | 2/2015 | Krischer | ............... | H04L 43/16 |
| | | | | 348/143 |
| 2015/0105059 A1* | 4/2015 | Lamberton | ........... | H04L 63/102 |
| | | | | 455/418 |
| 2015/0230091 A1* | 8/2015 | Sahu | ............... | H04L 43/18 |
| | | | | 455/410 |

OTHER PUBLICATIONS

Fu-Fang Hsiao, "A Design and Implementation for Remote Server Monitoring and Management System," Master Thesis of Department of Information Management, Shih Hsin University, 2006.

* cited by examiner

COMMUNICATION METHOD AND MOBILE ELECTRONIC DEVICE USING THE SAME

CROSS-REFERENCE TO RELATED APPLICATION

This application claims the priority benefit of Taiwan application serial no. 102143813, filed on Nov. 29, 2013. The entirety of the above-mentioned patent application is hereby incorporated by reference herein and made a part of this specification.

BACKGROUND OF THE INVENTION

Field of the Invention

The invention generally relates to a communication method, and more particularly, to a communication method and a mobile electronic device using the same both able to reduce the unwanted packets to be received so as to reduce the power consumption.

Description of Related Art

Along with the increasing progress of science and technology, many mobile electronic devices such as smart phone, laptop or tablet PC have been widely used in people's daily lives. All along, the power consumptions of a mobile electronic device is a problem for the developer to confront in the design thereof. Among the various power consumptions, the required power for a mobile electronic device to connect a wired or wireless network connection is just one of the major power consumptions. For example, when an electronic device is connected to the Internet via a public Internet protocol address (public IP address), it may receive tens of thousands of packets in the Internet, among which the most packets may not be the required by the mobile electronic device, but the mobile electronic device has to receive the packets and reply to the packet senders to cause useless power consumption.

SUMMARY OF THE INVENTION

Accordingly, the present invention is directed to a communication method and a mobile electronic device using the same both able to reduce the power consumption of the mobile electronic device for processing the unwanted packets.

The invention provides a communication method suitable for a mobile electronic device. The communication method of the invention includes: receiving a message packet; determining whether or not the received message packet is an abnormal packet; and when the received message packet is determined out as the abnormal packet, increasing a count value; keeping to perform the aforementioned steps; and when the count value is greater than a first upper-limit value, re-deriving an IP address.

The invention provides a mobile electronic device, which includes a communication unit and a processing unit coupled to the communication unit, wherein the processing unit performs following steps: receiving a message packet, first; determining whether or not the message packet is an abnormal packet, and when the message packet is determined out as the abnormal packet, increasing a count value; keeping to perform the aforementioned steps from a to b; and when the count value is greater than a first upper-limit value, re-deriving an IP address.

Based on the depiction above, the invention provides a communication method and a mobile electronic device using the method, which can determine out whether or not re-deriving an IP address according to the quantity of the received abnormal packets so as to reduce the times and chance of receiving abnormal packets.

In order to make the features and advantages of the present invention more comprehensible, the present invention is further described in detail in the following with reference to the embodiments and the accompanying drawings.

DESCRIPTION OF THE EMBODIMENTS

In general, by establishing a TCP connection (Transfer Control Protocol connection) or a UDP connection (User Datagram Protocol connection) between a client (for example, an electronic device or a mobile electronic device) and an Internet service provider (ISP) (for example, a remote server), both of the client and the ISP can exchange the data thereof. For example, in terms of establishing the TCP connection, a transmitting end (for example, the aforementioned remote server) may transmit a synchronization signal (SYN signal) to the client for connection request. At the time, if the client acknowledges to establish the connection, the client should reply an acknowledgement signal (ACK signal) to the transmitting end sending the SYN signal, followed by establishing the TCP connection. The aforementioned signal exchanging procedure is the so-called TCP three-way handshake procedure.

When the client determines out the transmitting end of transmitting the SYN signal is not the object for the client to establish the TCP connection, for example, the port corresponding to a connection information in the SYN signal is not a port open for use (i.e., not an open port), the client can determine out the SYN signal is an abnormal packet, and meanwhile transmits a reset signal (RST signal) to the transmitting end of the SYN signal so as to reject the connection request from the transmitting end. However, in order to receive these abnormal packets and transmit the RST signals in response to the abnormal packets, the client must consumes unnecessary power, even the client may wake up to a common operation state from a the hibernation state for merely determining out the received packet is an abnormal packet, transmitting the RST signal and then switching back to the hibernation state again, which makes the client waste more power by taking a useless cycle from the hibernation state to the hibernation state. If a client has suffered denial-of-network-service attack such as SYN flood attacks, the consumed power is more considerable.

In terms of establishing the UDP connection, since UDP does not perform the aforementioned three-way handshake procedure like in TCP connection, the client will directly receive regular data packets from the transmitting end. When the client determines out the data packet is not the packet the client wants to receive, the client can reply an ICMP (Internet Control Message Protocol) reject signal to the transmitting end to inform of no more transmitting any data. It should be noted that UDP is often used for transmitting a data stream so that the client may receive a complete, but not the required by the client, data stream, and power consumption could be considerable.

Accordingly, the invention provides a communication method and a mobile electronic device to enable the client such as the mobile electronic device reducing the chance of receiving abnormal packets during connecting the Internet.

Figure 1:
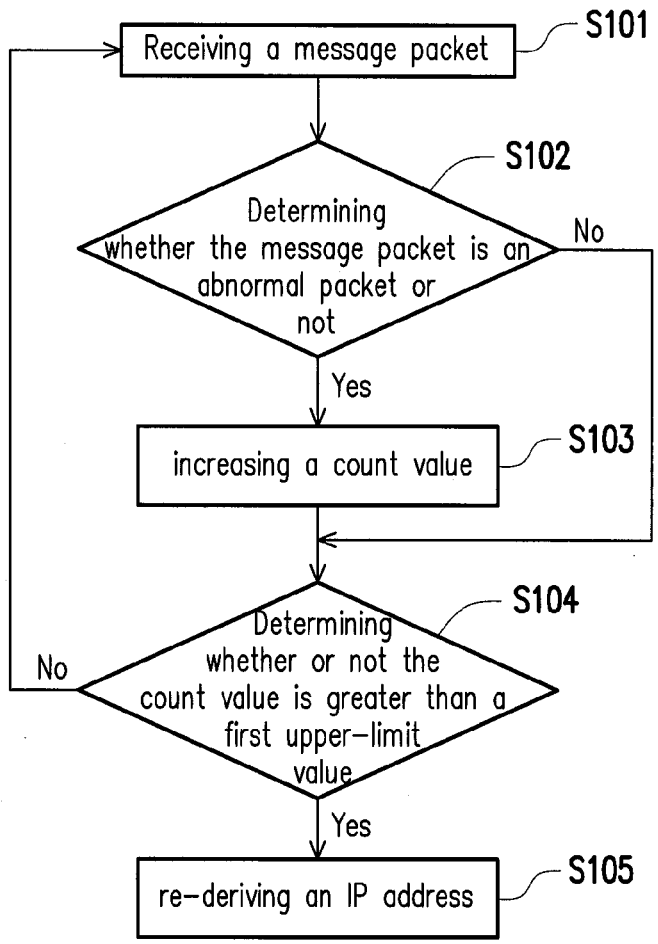
FIG. 1 is a schematic flowchart of a communication method according to an embodiment of the invention.

FIG. 1 is a schematic flowchart of a communication method according to an embodiment of the invention, wherein the communication method of the invention is suitable to all the electronic devices connected to the Internet, in particular, to the mobile electronic device in which power management plays important role while operating. Referring to FIG. 1, first in step S101, a message packet is received. Next, in step S102, it is determined whether or not the message packet is an abnormal packet. When the message packet is determined out as the abnormal packet, in step S103, a count value is increased. Then, in step S104, it is determined whether or not the count value is greater than a first upper-limit value. If the count value is not greater than a first upper-limit value, the aforementioned steps S101-S103 are continuously performed. If the count value is greater than the first upper-limit value, in step S105, the IP address is re-derived.

The aforementioned message packet herein can be a TCP SYN signal received from a transmitting end in the Internet (for example, a server), a data packet of UDP connection or other formats of network data packets. Many implementations are available to determine whether or not a message packet is an abnormal packet. For example, it is determined whether or not the port corresponding to the message packet is open, whether or not the header of the message packet includes correct information by parsing the header, whether or not the transmitting end is an identified server or a combination of the mentions above, which the invention is not limited to.

In the embodiment, when the message packet is determined to be an abnormal packet, the mobile electronic device, in addition to transmit an RST signal (or an ICMP reject signal), further increases the count value; when the count value is greater than a first upper-limit value, i.e., when the amount of the received abnormal packet has reached an upper limit, the mobile electronic device re-derives the IP address.

Since the major reason to receive these abnormal packets often rests in that these abnormal packets may be the data packet transmitted to the client that had used the same IP address (for example, another mobile electronic device or another smart phone), so that after the mobile electronic device re-derives another IP address, it can avoid the data packets transmitted to the previous IP address so as to reduce the chance of receiving the abnormal packet.

Many implementations are available to re-derive an IP address. Among them, a more intuitive method is to directly disconnect the connection linked to the linking nodes of the Internet (for example, an Internet router, a wireless LAN access point or a base station of a mobile data network), followed by re-performing a connection procedure, so that the linking nodes can reallocate the new IP address to the mobile electronic device through Dynamic Host Configuration Protocol (DHCP). At the time, the mobile electronic device will re-derive a new IP address, which the present invention is not limited thereto.

Figure 2:
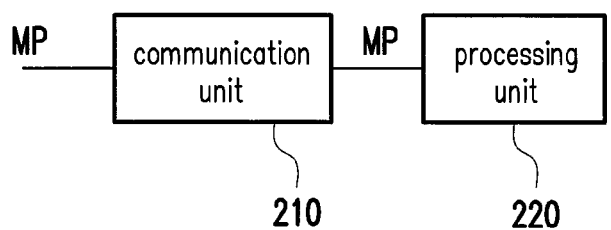
FIG. 2 is a function block diagram of a mobile electronic device according to an embodiment of the invention.

FIG. 2 is a function block diagram of a mobile electronic device according to an embodiment of the invention. Referring to FIGS. 1 and 2, a mobile electronic device 20 includes a communication unit 210 and a processing unit 220 coupled to the communication unit 210. The processing unit 220 is used to perform following steps. First in step S101, a message packet MP is received. Next, in step S102, it is determined whether or not the message packet MP is an abnormal packet. When the message packet is determined out as the abnormal packet, in step S103, a count value is increased. Then, in step S104, it is determined whether or not the count value is greater than a first upper-limit value. If the count value is not greater than a first upper-limit value, the aforementioned steps S101-S103 are continuously performed. If the count value is greater than the first upper-limit value, in step S105, the IP address is re-derived. The implementation details of steps S101-S105 can refer to the depiction of the embodiment in FIG. 1.

It should be noted that in an embodiment of the invention, the aforementioned steps can be implemented with physical circuits. In an embodiment of the invention, the processing unit 220 can be used to operate an operation system and the aforementioned steps can be implemented by functions or a software module in an operating system. In particular, steps S101-S103 can be implemented by a module in the processing unit belonging to transport layer, for example, a kernel module in the operating system, while steps S104-S105 can be implemented by a module belonging to application layer, for example, an application or a resident program, which the present invention is not limited to.

Figure 3:
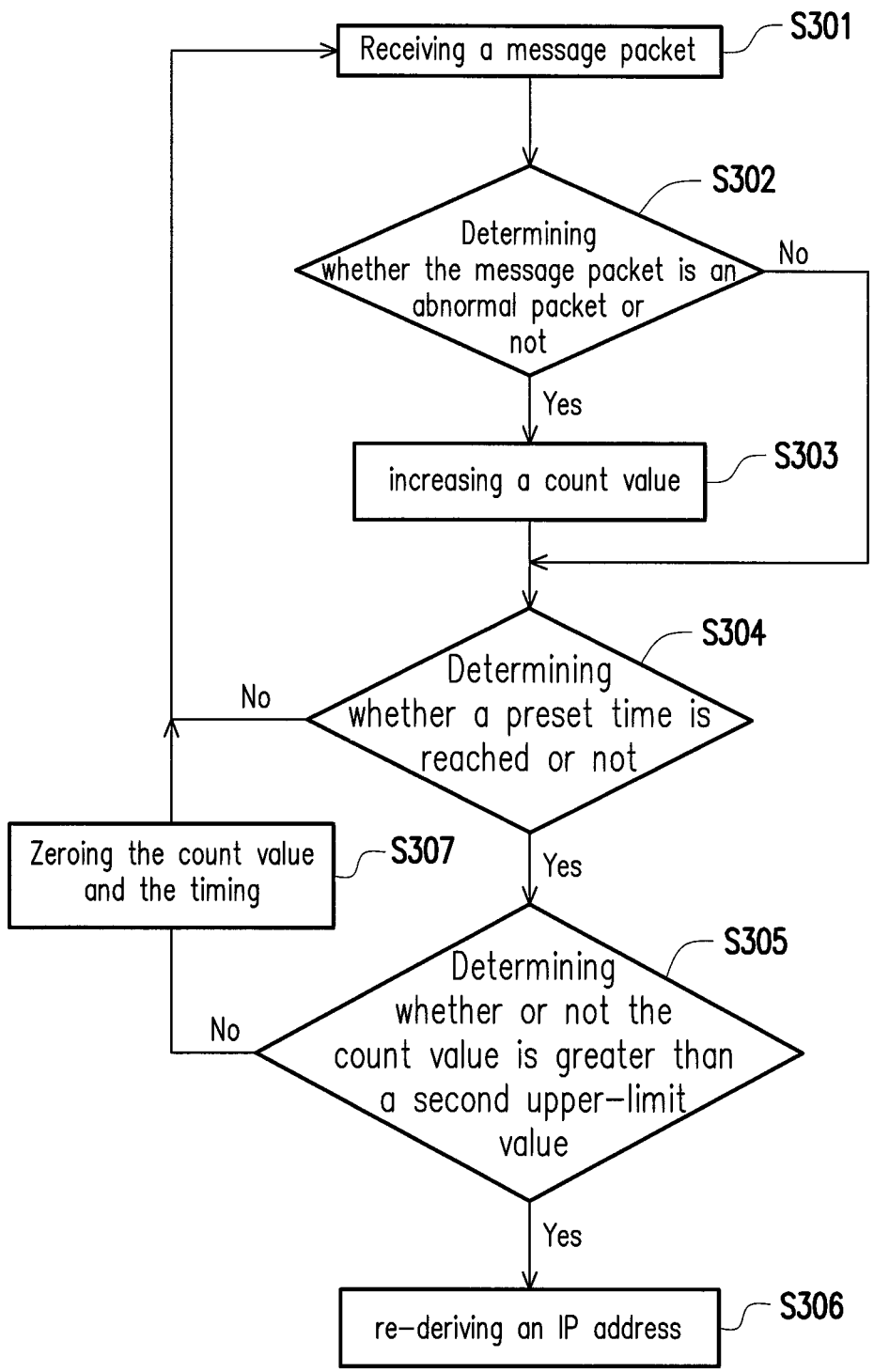
FIG. 3 is a schematic flowchart of a communication method according to another embodiment of the invention.

FIG. 3 is a schematic flowchart of a communication method according to another embodiment of the invention. The unique of the embodiment in FIG. 3 from the embodiment of FIG. 1 rests in that the contents to determine whether or not a new IP address is derived are different from each other. Referring to FIGS. 2 and 3, first, the processing unit 220 receives the message packet MP through the communication unit 210, for example, the aforementioned SYN signal and meanwhile timing is started (step S301). Then, whenever the processing unit 220 receives a message packet MP through the communication unit 210, it is determined whether or not the message packet is an abnormal packet through that, for example, determining whether or not the port corresponding to the message packet MP is an open port or a usable port (step S302). If the port corresponding to the message packet MP is not an open port or a usable port, the processing unit 220 increases the count value (step S303). Thereafter, no matter the presently received message packet MP is an abnormal packet or not, the mobile electronic device 20 will further determines whether or not a preset time is reached (step S304). If the preset time is not reached yet, the processing unit 220 continuously receives the message packet MP through the communication unit 210 and determines whether or not the received message packet is an abnormal packet again (steps S301-S303). When the preset time is reached according to the determination of the processing unit 220 ("yes" result in step S304), the processing unit 220 will determines whether or not the present count value is greater than a second upper-limit value (step S305). If the result is "yes", it represents the mobile electronic device 20 has received too many abnormal packets in the preset time, so that the processing unit 220 would re-derive an IP address (step S306). If it is determined out the count value in the preset time is less than the second upper-limit value ("no" result in step S305), the processing unit 220 will zero the count value and the timing (step S307) and go on to receive the message packet MP through the communication unit 210 (step S301).

In short, the unique of the embodiments in FIG. 3 from the embodiment in FIG. 1 rests in that in the embodiment of FIG. 3, in addition to count the abnormal packet, the processing unit 220 further conduct the determination of time. In practical uses, the preset time can take second or minute as the time unit by setting, for example, the preset time can be 5-6 Min., while the upper-limit value can be 10 Min. or less. For example, when the electronic device 20 receives 8 or 9 abnormal packets in 5-6 Min., the processing unit 220 can decide it needs to re-derive an IP address, which the present invention is not limited thereto.

In summary, the invention provides a communication method and a mobile electronic device using the method, which can determine out whether or not it needs to re-derive a new IP address according to the quantity of the so far received abnormal packets so as to reduce the chance of successively receiving abnormal packets by deriving a new IP address. After the quantity of the received abnormal packets is reduced, the mobile electronic device can accordingly reduce the unnecessary power consume caused by receiving and replying these abnormal packets. In this way, the invention can achieve better power management state and increase the user's experience of using the mobile electronic device.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention. In view of the foregoing, the protective scope of the present invention is given by the following claims and their equivalents.

What is claimed is:

1. A communication method, suitable for a mobile electronic device and comprising:
   a. receiving a message packet by an original IP address and starting a timing counter;
   b. determining whether or not the message packet is an abnormal packet, and when the message packet is determined out as the abnormal packet, increasing a count value, wherein the step of determining whether or not the message packet is the abnormal packet comprises: determining whether or not a port corresponding to the message packet is a port open for use, determining whether or not a header of the message packet includes correct information by parsing the header, determining whether or not the message packet takes an identifier server as a transmitting end, and the message packet is determined as the abnormal packet when at least one determination result is negative;
   c. determining whether the timing counter reaches a preset time, wherein the preset time is in minutes;
   d. if the timing counter does not reach the preset time, keeping to perform the aforementioned steps from a. to b.; and
   e. if the timing counter reaches the preset time, determining whether the count value of the abnormal packet is greater than a limit value;
   f. interrupting a present connection when the count value of the abnormal packet is greater than the limit value and re-performing a connection procedure to re-derive an IP address different from the original IP address; and
   g. zeroing the timing counter and the count value when the count value of the abnormal packet is not greater than the limit value, and keeping to perform the aforementioned steps from a. to f.

2. The communication method as claimed in claim 1, wherein the message packet is a synchronization signal (SYN signal) of Transfer Control Protocol (TCP) or a data packet of User Datagram Protocol (UDP).

3. A mobile electronic device, comprising:
   a communication unit; and
   a processing unit, coupled to the communication unit, wherein the processing unit performs following steps:
      a. receiving a message packet by an original IP address and starting a timing counter;
      b. determining whether or not the message packet is an abnormal packet, and when the message packet is determined out as the abnormal packet, increasing a count value, wherein the step of determining whether or not the message packet is the abnormal packet comprises: determining whether or not a port corresponding to the message packet is a port open for use, determining whether or not a header of the message packet includes correct information by parsing the header, determining whether or not the message packet takes an identifier server as a transmitting end, and the message packet is determined as the abnormal packet when at least one determination result is negative;
      c. determining whether the timing counter reaches a preset time, wherein the preset time is in minutes;
      d. if the timing counter does not reach the preset time, keeping to perform the aforementioned steps from a. to b.; and
      e. if the timing counter reaches the preset time, determining whether the count value of the abnormal packet is greater than a limit value;
      f. interrupting a present connection when the count value of the abnormal packet is greater than the limit value and re-performing a connection procedure to re-derive an IP address different from the original IP address; and
      g. zeroing the timing counter and the count value when the count value of the abnormal packet is not greater than the limit value, and keeping to perform the aforementioned steps from a. to f.

4. The mobile electronic device as claimed in claim 3, wherein:
   the message packet is a synchronization signal (SYN signal) of Transfer Control Protocol (TCP) or a data packet of User Datagram Protocol (UDP).

* * * * *